(12) United States Patent
Liu et al.

(10) Patent No.: US 8,840,297 B2
(45) Date of Patent: Sep. 23, 2014

(54) BACK-LIGHT MODULE

(75) Inventors: Wen-Kuei Liu, Changhua County (TW);
Sheng-Wen Chen, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 133 days.

(21) Appl. No.: 13/353,325

(22) Filed: Jan. 19, 2012

(65) Prior Publication Data

US 2013/0121020 A1 May 16, 2013

(30) Foreign Application Priority Data

Nov. 10, 2011 (TW) .............................. 100141053 A

(51) Int. Cl.
*F21V 7/04* (2006.01)
*F21V 8/00* (2006.01)
(52) U.S. Cl.
CPC ............ *G02B 6/0021* (2013.01); *G02B 6/0068* (2013.01); *G02B 6/0018* (2013.01)
USPC ............................ 362/628; 362/615; 362/621
(58) Field of Classification Search
USPC .................................................. 362/600–632
See application file for complete search history.

(56) References Cited

U.S. PATENT DOCUMENTS

2010/0149802 A1* 6/2010 Chang ............................ 362/235
2010/0284202 A1* 11/2010 Pan et al. ....................... 362/606
2012/0170249 A1* 7/2012 Shan et al. .................... 362/97.1

FOREIGN PATENT DOCUMENTS

| CN | 1567046 | 1/2005 |
|---|---|---|
| TW | 200615663 | 5/2006 |
| TW | M328589 | 3/2008 |
| TW | 200841060 | 10/2008 |
| TW | M408049 | 7/2011 |

OTHER PUBLICATIONS

"First Office Action of China Counterpart Application", issued on Apr. 1, 2013, p. 1-p. 4, in which the listed reference was cited.
"Office Action of Taiwan Counterpart Application", issued on May 27, 2014, p. 1-p. 8, in which the listed reference was cited.

* cited by examiner

*Primary Examiner* — William Carter
(74) *Attorney, Agent, or Firm* — Jianq Chyun IP Office

(57) ABSTRACT

A back-light module including a light guide plate (LGP), first light-emitting devices, and second light-emitting devices is provided. The LGP has a top-emitting surface, a bottom surface and a side surface. The LGP has at least one indentation. The indentation has a first light-incident sidewall and a pair of second light-incident sidewalls. The second light-incident sidewalls are located on two sides of the first light-incident sidewall and adjacent to the first light-incident sidewall. Normal vectors of the second light-incident sidewalls and the first light-incident sidewall are not parallel. The first light-emitting devices are located in the indentation, and a first light beam propagating toward the first light-incident sidewall is emitted from each of the first light-emitting devices. The second light-emitting devices are located in the indentation, and a second light beam propagating toward one of the second light-incident sidewalls is emitted from each of the second light-emitting devices.

11 Claims, 3 Drawing Sheets

BACK-LIGHT MODULE

CROSS-REFERENCE TO RELATED APPLICATION

This application claims the priority benefit of Taiwan application serial no. 100141053, filed on Nov. 10, 2011. The entirety of the above-mentioned patent application is hereby incorporated by reference herein and made a part of this specification.

BACKGROUND OF THE INVENTION

1. Field of the Invention

The present invention relates to a liquid crystal display (LCD), and more particularly relates to a back-light module in an LCD.

2. Description of Related Art

Since an LCD has the advantages of low operating voltage, no radiation scattering, light weight, and small volume that cannot be achieved by a conventional cathode ray tube (CRT) display. Therefore, the LCD has become the major researching subject in the display field, and is continuously developed in the trend of colorization.

The LCD is a non-self-luminescent display, so the LCD needs a back-light module to provide a light beam to achieve the display function. In recent years, with the improvement of environmental protection awareness, the light-emitting device used in the back-light module adopts a light-emitting diode (LED) component to replace a cold cathode fluorescent lamp (CCFL). When the LED component is applied to the back-light module, for a side-view back-light module for example, the LED component is usually disposed on a bar-shaped printed circuit board to form an LED light bar. The LED light bar is usually electrically connected to a control circuit board through a flexible printed circuit (FPC).

FIG. 1 is a schematic top view of a light guide plate and an LED light bar in a conventional side-view back-light module. Referring to FIG. 1, the conventional side-view back-light module 100 includes a light guide plate 110 and a linear light source 120. The light guide plate has a top-emitting surface 112 and a side incident surface 114 connected to the top-emitting surface 112. The top-emitting surface 112 includes a peripheral area 112a and an effective illumination area 112b connected to the side incident surface 114. As shown in FIG. 1, the linear light source 120 is configured beside the side incident surface 114, and the linear light source 120 includes a circuit board 122 and a plurality of LED components 124. The LED components 124 are mounted on the circuit board 122 and are electrically connected to the circuit board 122.

As shown in FIG. 1, in the linear light source 120, a pitch between any two adjacent LED components 124 is P, and a shortest distance between the light-emitting surface of each LED component 124 and an edge of the effective illumination area 112b is A. To enable the brightness in the effective illumination area 112b to be uniform, the manufacturer determines an optimal A/P ratio according to a divergence angle α of the light beam of the LED component 124. However, currently, the LCD has been developed towards narrow frames. To meet the design requirement of narrow frames, the shortest distance A is inevitably reduced as required. When the A/P ratio is critically low, hot spots may appear in the effective illumination area 112b adjacent to the side incident surface 114. The shadow in FIG. 1 refers to the area with low brightness. The hot spots may be solved by reducing the pitch P, but when the pitch P is reduced, the manufacturer must use more LED components 124, which causes the increase of the cost.

Accordingly, it has become the subject in need of solution how to solve the hot spots caused by the low A/P ratio without increasing the number of the light-emitting devices and greatly increasing the manufacturing cost.

SUMMARY OF THE INVENTION

The present invention is directed to a back-light module and an LCD with the back-light module.

The present invention provides a back-light module, which includes a light guide plate, a plurality of first light-emitting devices, and a plurality of second light-emitting devices. The light guide plate has a top-emitting surface, a bottom surface opposite to the top-emitting surface, and a side surface connecting the top-emitting surface and the bottom surface. The light guide plate has at least one indentation. The indentation has a first light-incident sidewall and a pair of second light-incident sidewalls. The second light-incident sidewalls are respectively located on two opposite sides of the first light-incident sidewall and adjacent to the first light-incident sidewall. Normal vectors of the second light-incident sidewalls and the first light-incident sidewall are not parallel. Each of the first light-emitting devices is located in the indentation, and a first light beam propagating toward the first light-incident sidewall is emitted from each of the first light-emitting devices. Each of the second light-emitting devices is located in the indentation, and a second light beam propagating toward one of the second light-incident sidewalls is emitted from each of the second light-emitting devices.

In an embodiment of the present invention, the first light-incident sidewall and the second light-incident sidewalls have a plurality of optical micro-structures.

In an embodiment of the present invention, an included angle between the second light-incident sidewall and the first light-incident sidewall is substantially equal to β, and β≥90°.

In an embodiment of the present invention, the first light-emitting devices and the second light-emitting devices include LED packages.

In an embodiment of the present invention, the first light-emitting devices are arranged at equal intervals.

In an embodiment of the present invention, a luminance of the first light-emitting devices is lower than a luminance of the second light-emitting devices.

In an embodiment of the present invention, the back-light module may further include a circuit board, in which the first light-emitting devices and the second light-emitting devices are mounted on the circuit board and are electrically connected to the circuit board.

In an embodiment of the present invention, the LCD panel has a display region, and the light guide plate has a main illumination area, in which the main illumination area is corresponding to the display region, and the indentation is located outside the main illumination area.

In an embodiment of the present invention, the side surface further has a pair of sidewalls, the sidewalls are respectively located on two opposite sides of the indentation, each of the sidewalls is adjacent to one of the second light-incident sidewalls respectively, and an included angle between each of the sidewalls and a corresponding second light-incident sidewall is substantially equal to γ, and γ<90°.

In an embodiment of the present invention, the sidewall is a reflective surface.

In an embodiment of the present invention, the sidewall has a reflective layer disposed thereon.

Since the first light-emitting devices in this application are arranged at a small pitch within the indentation on the side surface of the light guide plate, the hot spots are not easily generated in this application. Moreover, in this application, the second light-emitting devices are disposed in the indentation on the side surface of the light guide plate to improve the uniformity of illumination distribution provided by the light guide plate.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
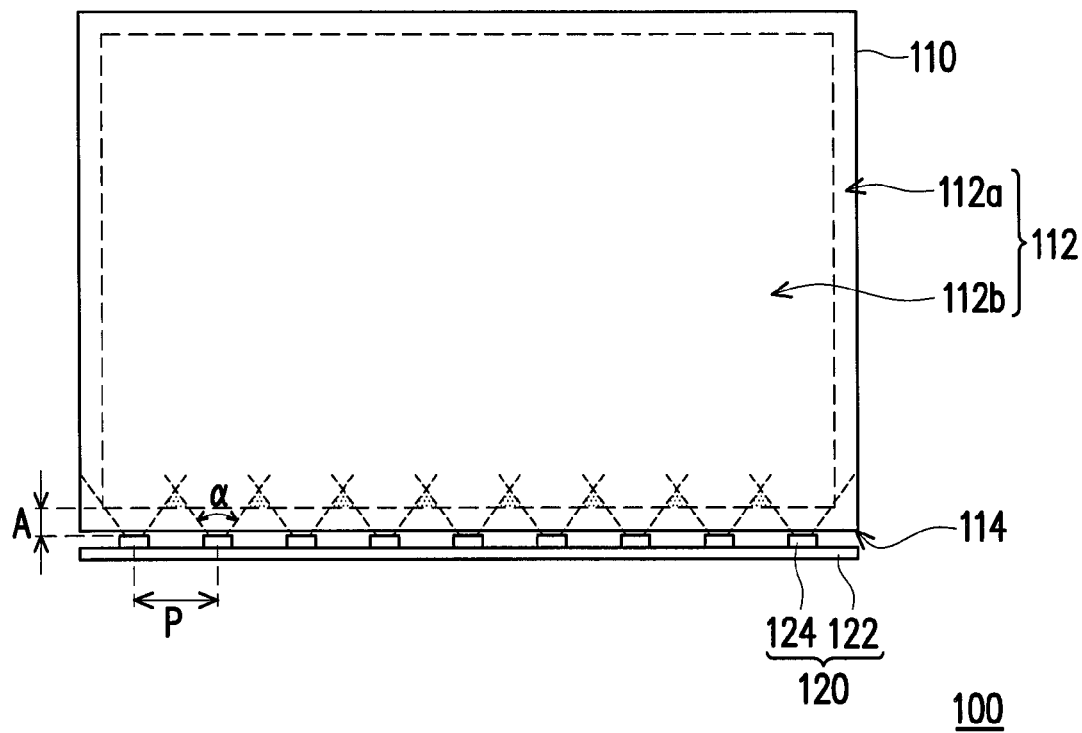
FIG. 1 is a schematic top view of a conventional side-view back-light module.

Reference will now be made in detail to the present embodiments of the invention, examples of which are illustrated in the accompanying drawings. Wherever possible, the same reference numbers are used in the drawings and the description to refer to the same or like parts.

Figure 2:
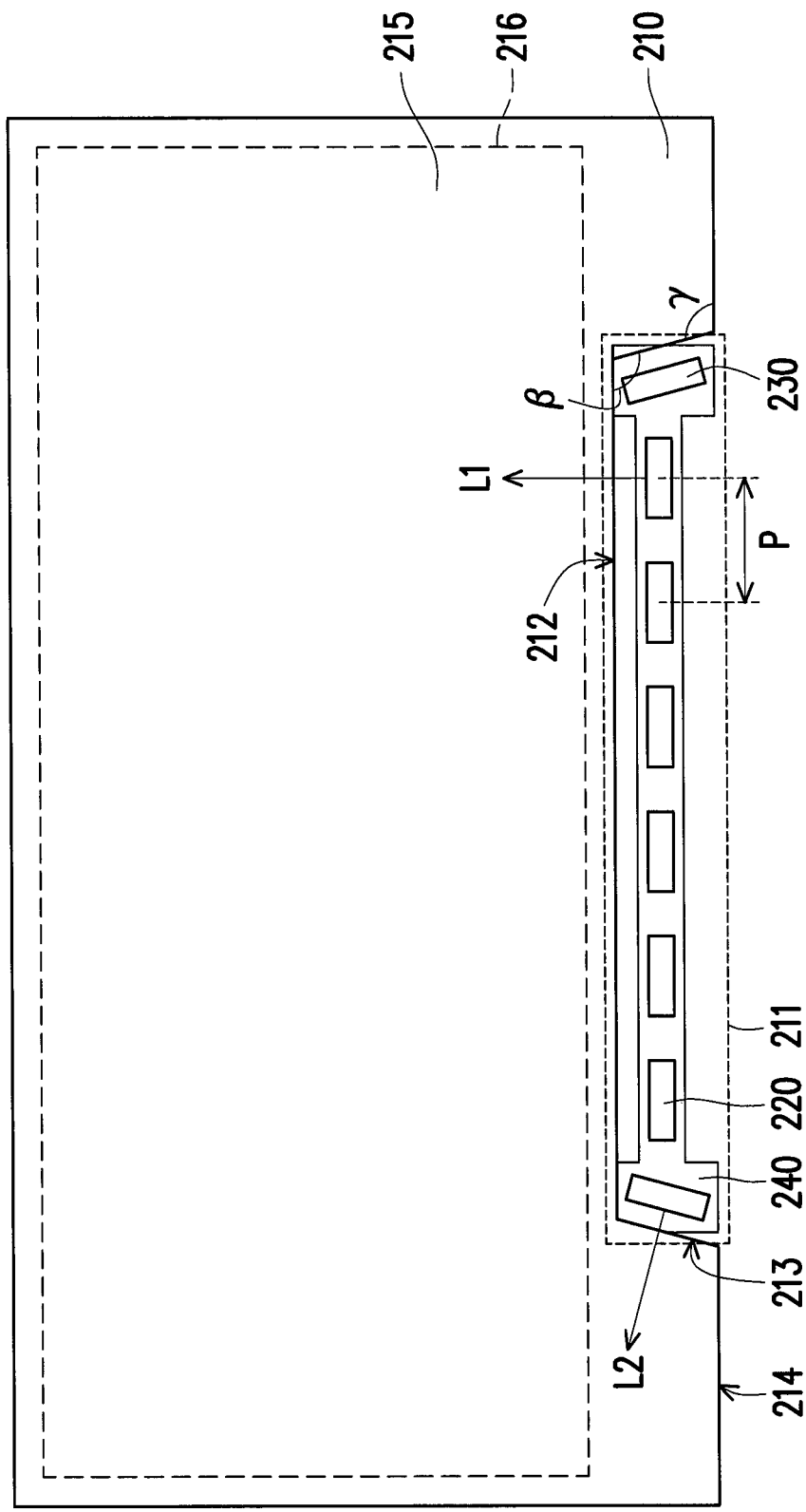
FIG. 2 is a schematic top view of a back-light module according to an embodiment of the present invention.

FIG. 2 is a schematic top view of a back-light module according to an embodiment of the present invention. Referring to FIG. 2, the back-light module 200 of this embodiment includes a light guide plate 210, a plurality of first light-emitting devices 220, and a plurality of second light-emitting devices 230. The light guide plate 210 has a top-emitting surface 215, a bottom surface opposite to the top-emitting surface 215, and a side surface 214 connecting the top-emitting surface 215 and the bottom surface. For example, the top-emitting surface 215 of the light guide plate 210 has a main illumination area 216, and the main illumination area 216 is corresponding to a display region of an LCD panel.

As shown in FIG. 2, the light guide plate 210 has at least one indentation 211. The indentation 211 is located on the side surface 214, and the indentation 211 has a first light-incident sidewall 212 and a pair of second light-incident sidewalls 213. The second light-incident sidewalls 213 are respectively located on two opposite sides of the first light-incident sidewall 212 and are respectively adjacent to the first light-incident sidewall 212. Normal vectors of the second light-incident sidewalls 213 and the first light-incident sidewall 212 are not parallel. In this embodiment, the first light-incident sidewall 212 is, for example, substantially perpendicular to the top-emitting surface 215, and the second light-incident sidewalls 213 are, for example, substantially perpendicular to the top-emitting surface 215. Moreover, a distribution position of the indentation 211 is, for example, corresponding to an area outside the main illumination area 216.

In this embodiment, the first light-incident sidewall 212 and the second light-incident sidewalls 213 are not located on the same plane. In other words, an included angle β is formed between the first light-incident sidewall 212 and the second light-incident sidewall 213. For example, the included angle β is greater than or substantially equal to 90°.

It can be clearly seen from FIG. 2 that the first light beam L1 emitted by the first light-emitting devices 220 propagates toward the first light-incident sidewall 212, and enters the light guide plate 210 through the first light-incident sidewall 212. The second light beam L2 emitted by the second light-emitting devices 230 propagates toward a corresponding second light-incident sidewalls 213, and enters different areas of the light guide plate 210 through the corresponding second light-incident sidewalls 213. Accordingly, the first light-emitting devices 220 and the second light-emitting devices 230 provide the light beams having three different incident angles.

To further improve the optical performance of the light guide plate 210, optical micro-structures are optionally fabricated on surfaces of the first light-incident sidewall 212 and the second light-incident sidewalls 213 in this embodiment. In this embodiment, the optical micro-structures are, for example, micro prisms, printed scattering dots, or the like.

In this embodiment, the first light-emitting devices 220 are, for example, LEDs, and the light-emitting surface faces towards the first light-incident sidewall 212, so that the first light beam L1 enters the light guide plate 210 through the first light-incident sidewall 212. Likewise, the second light-emitting devices 230 are, for example, LEDs, and the light-emitting surface of each of the second light-emitting devices 230 respectively faces towards one of the second light-incident sidewalls 213, so that the second light beam L2 enters the light guide plate 210 through the second light-incident sidewalls 213. For example, the first light-emitting devices 220 and the second light-emitting devices 230 are, for example, side-view LED packages or top-view LED packages. The first light-emitting devices 220 and the second light-emitting devices 230 are, for example, mounted on a circuit board 240, and are electrically connected to the circuit board. In this embodiment, the circuit board 240 is, for example, a flexible printed circuit board (Flexible PCB) or a rigid printed circuit board (rigid PCB).

It should be noted that the first light-emitting devices 220 may be arranged at equal intervals. Since the first light-emitting devices 220 are arranged at the minimal arrangement pitch P in the indentation 211 of the light guide plate 210 in this embodiment, the hot spots are not easily generated in this embodiment. Moreover, the second light-emitting devices 230 are disposed in the indentation 221 of the light guide plate 210 in this embodiment to improve the uniformity of illumination distribution provided by the light guide plate 210.

In some embodiments, in order to maintain the uniformity of illumination distribution provided by the light guide plate 210, the first light-emitting devices 220 and second light-emitting devices 230 of different specifications may be adopted. In details, the second light-emitting devices 230 with high luminance and the first light-emitting devices 220 with low luminance (that is, the luminance of the second light-emitting devices 230 is higher than the luminance of the first light-emitting devices 220) may be selected, so as to avoid the non-uniform brightness on the light exiting surface 215 of the light guide plate 210.

Figure 3:
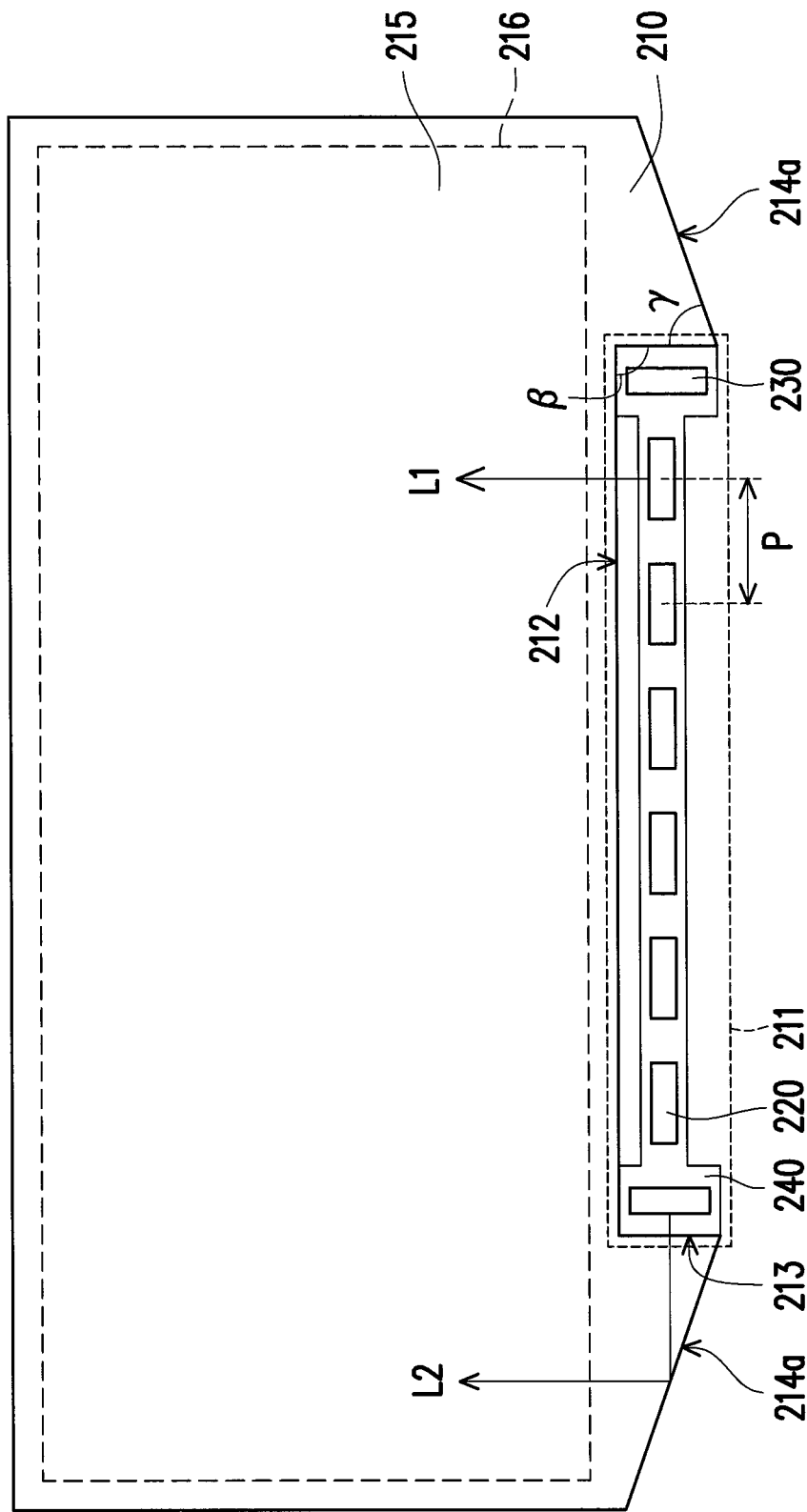
FIG. 3 is a schematic top view of a back-light module according to another embodiment of the present invention.

FIG. 3 is a schematic top view of a back-light module according to another embodiment of the present invention. Referring to FIG. 3, the back-light module 200' of this embodiment is similar to the back-light module 200 of the above embodiment. The difference lies in that the light guide plate 210' of this embodiment has a pair of slanted sidewalls 214a, and the pair of the sidewalls 214a are respectively located on two opposite sides of the indentation 211. Each of the sidewalls 214a is respectively adjacent to one of the second light-incident sidewalls 213, and each of the sidewalls 214a and the corresponding second light-incident sidewall 213 are not located on the same plane. In other words, an included angle between the sidewall 214a and the corresponding second light-incident sidewalls 213 is substantially equal to γ, and the included angle γ<90°. Moreover, an included angle β between the first light-incident sidewall 212 and the second light-incident sidewall 213 is, for example, 90°.

It should be noted that the sidewalls 214a may be mirrors or reflective surfaces, so as to reflect the second light beam L2 that enters the light guide plate 210 and direct the second light beam L2 to the main illumination area 216, thereby improving the brightness of left and right sides of the main illumination area 216.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back-light module configured below a liquid crystal display (LCD) panel, the back-light module comprising:
    a light guide plate comprising a top-emitting surface, a bottom surface opposite to the top-emitting surface, and a side surface connecting the top-emitting surface and the bottom surface, wherein the light guide plate comprises at least one indentation, the indentation comprises a first light-incident sidewall and a pair of second light-incident sidewalls, the pair of second light-incident sidewalls are respectively located on two opposite sides of the first light-incident sidewall and adjacent to the first light-incident sidewall, and normal vectors of the second light-incident sidewalls and the first light-incident sidewall are not parallel;
    a plurality of first light-emitting devices located in the indentation, wherein a first light beam propagating toward the first light-incident sidewall is emitted from a light-emitting surface of each of the first light-emitting devices;
    a plurality of second light-emitting devices, located in the indentation, wherein a second light beam propagating toward one of the second light-incident sidewalls is emitted from each of the second light-emitting devices; and
    a pair slanted of sidewalls respectively located on two opposite sides of the indentation, each of the slanted sidewalls is adjacent to and directly connected with one of the second light-incident sidewalls and the side surface respectively, and an included angle between each of the slanted sidewalls and the corresponding second light-incident sidewall is substantially equal to γ, and γ<90°.

2. The back-light module according to claim 1, wherein the first light-incident sidewall and the pair of second light-incident sidewalls comprise a plurality of optical micro-structures.

3. The back-light module according to claim 1, wherein an included angle between each of the second light-incident sidewalls and the first light-incident sidewall is substantially equal to β, and β≥90°.

4. The back-light module according to claim 1, wherein the first light-emitting devices and the second light-emitting devices comprise light-emitting diode (LED) packages.

5. The back-light module according to claim 1, wherein the first light-emitting devices are arranged at equal intervals.

6. The back-light module according to claim 1, wherein a luminance of each of the first light-emitting devices is lower than a luminance of each of the second light-emitting devices.

7. The back-light module according to claim 1, further comprising a circuit board, wherein the first light-emitting devices and the second light-emitting devices are mounted on the circuit board and are electrically connected to the circuit board.

8. The back-light module according to claim 1, wherein the LCD panel comprises a display region, and the light guide plate comprises a main illumination area, the main illumination area is corresponding to the display region, and the indentation is located outside the main illumination area.

9. The back-light module according to claim 1, wherein each of the sidewalls is a reflective surface.

10. The back-light module according to claim 1, wherein each of the sidewalls comprises a reflective layer disposed thereon.

11. The back-light module according to claim 1, wherein an included angle between each of the second light-incident sidewalls and the first light-incident sidewall is 90°.

* * * * *